Aug. 18, 1936.     F. M. HESS     2,051,523
APPARATUS FOR DETERMINING THE CONSISTENCY OF LIQUIDS
Filed Sept. 7, 1933
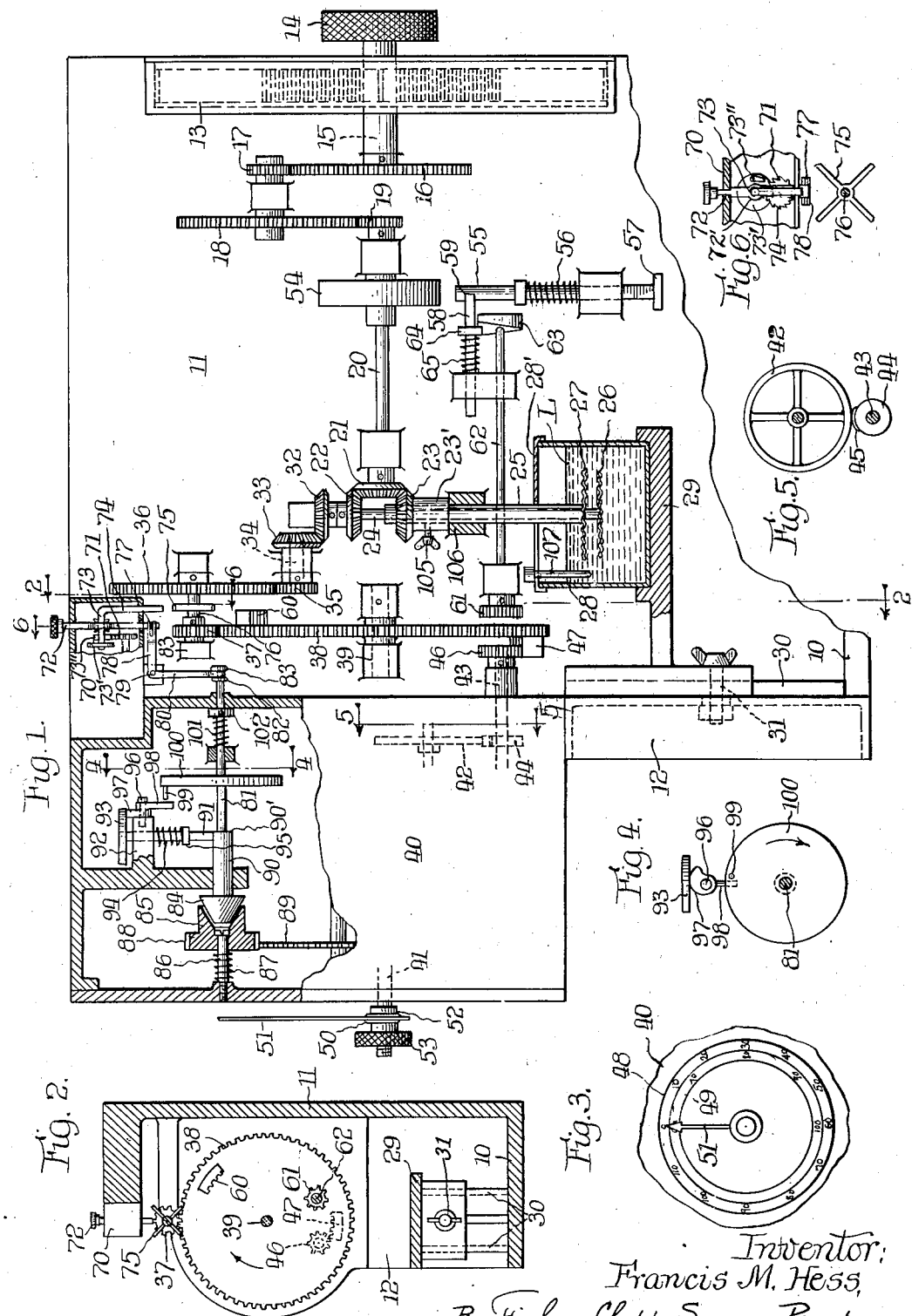
Inventor:
Francis M. Hess,
By Fisher, Clapp, Soans & Pond Attys.

Patented Aug. 18, 1936

2,051,523

UNITED STATES PATENT OFFICE 2,051,523

APPARATUS FOR DETERMINING THE CONSISTENCY OF LIQUIDS

Francis M. Hess, Chicago, Ill.

Application September 7, 1933, Serial No. 688,445

12 Claims. (Cl. 265—11)

This invention relates to devices for testing the consistency or viscosity of oils and other liquids, and has been designed mainly for testing crank case oil in garages, filling stations, and elsewhere to enable the owner or driver of a car to ascertain in a simple and expeditious manner whether or not the lubricating oil in his car is of the correct consistency for most efficiently serving the motor under any given operating temperature.

In the testing of liquids such as oils, paints, etc., a great deal of importance has been placed on the viscosity test. The usual viscosity test is made by passing the liquid through an orifice and measuring the time of its flow. There are other characteristics of liquids that afford a better means of determining its viscosity. One is the resistance of the liquid to a force tending to set it in motion. This involves the adhesion of the liquid to a contacting surface or surfaces. In the case of lubricants this adhesion is one of the factors that establishes its lubricating value. And a factor involved in such resistance is the consistency of the liquid at the particular temperature at which it is being tested, since it is well known that such liquids as lubricating oils offer a much greater resistance to a displacing force when cold than when warm or hot.

These other characteristics of liquids offer better means of comparison than the usual viscosity test above alluded to. One of the objects of this invention is to provide a testing apparatus that will be based on and take advantage of these characteristics. Another object is to provide a testing apparatus that will, in its operation, subject the liquid to operating conditions closely similar to the operating conditions which it encounters in actual use. Another object is to provide means to quickly compare liquids at different temperatures, or to quickly correct for temperature if an immediate test is desired on a liquid at a different temperature than that of the room where the test is made.

Still other objects and advantages of the invention will be apparent to persons skilled in the art as the same becomes better understood by reference to the following detail description, taken in connection with the accompanying drawing, wherein I have illustrated one practical physical embodiment of the principle of the invention, and in which—

Fig. 1 is a front elevation partly in vertical section, of the complete apparatus.

Fig. 2 is a vertical transverse section, on a reduced scale, taken on the line 2—2 of Fig. 1.

Fig. 3 is a face view of the dial.

Fig. 4 is a detail view of a portion of an automatic counter throw-out mechanism, taken on the line 4—4 of Fig. 1.

Fig. 5 is a detail view of a portion of a stop and release device for the timer.

Fig. 6 is a detail sectional view on line 6—6 of Fig. 1, of a portion of the counter actuating mechanism.

Referring to the drawing, a suitable supporting frame for the apparatus may comprise a base plate 10, a vertical rear wall 11, and an end wall 12. Mounted on one end of the rear wall 11 is a power unit, which may conveniently consist of a spring motor 13 adapted to be wound by a knob 14, and transmitting its power to a shaft 15. Through speed-multiplying gears 16, 17, 18 and 19, the movement is transmitted to a shaft 20. On the inner end of shaft 20 is a miter gear 21 imparting rotation in opposite directions to a pair of oppositely facing miter gears 22 and 23. The gear 22 is keyed to a vertical shaft 24, and the gear 23 is keyed to a tubular shaft 25 encircling the shaft 24. Fast on the lower ends of shafts 24 and 25 are a pair of liquid agitating members 26 and 27 respectively, which preferably take the form of radially corrugated discs. These discs are adapted to be immersed in a body L of oil or other liquid to be tested as to its viscosity, this liquid being confined in a container or tank 28, supported on a shelf or platform 29 that is slidably mounted on ways 30 on the wall 12, and can be clamped at the desired height thereon by means of a clamp bolt 31.

The two agitating discs 26 and 27 are obviously driven simultaneously in opposite directions from the miter gear 21, and the shaft 24 also has keyed thereto, above the gear 22, a miter gear 32 driving a miter gear 33 on a short shaft 34. Shaft 34, through a train of speed-reducing gears 35, 36 and 37, drives a large gear 38 fast on a shaft 39.

40 designates as an entirety a suitable generally rectangular housing that may be supported on the walls 11 and 12, and contains a timer mechanism, which may be, for instance, an ordinary spring driven clock train, the details of which are not shown as they are old and well known. 41 may designate the minute hand arbor of the clock train, and 42 may designate the escapement wheel of the train. Journaled in one wall of the casing 40 is a shaft 43 that carries on its inner end a disc 44 (Fig. 5) lying in the plane of the escapement wheel 42, and equipped at one point of its periphery with a brake shoe 45 adapted, through frictional contact with the escapement wheel 42, to arrest the movement of the clock train. On the outer end of the shaft 43 is a pinion 46 that, once during each revolution of the large gear 38, is engaged and given a half turn by a segment rack 47 fast on one face of the gear 38. This last described movement retracts the brake shoe 45 from the escapement wheel 42 and permits the timing mechanism to operate. At the end of a complete rotation of gear 38, the rack 47 reengages the gear 46 and gives it another half turn, which brings the brake shoe 45 into contact with the escapement wheel 42 and stops the timing mechanism. Thus, the timing mechanism is permitted to operate during one complete rotation of the gear 38, and its movement is then arrested. Referring more particularly to Figs. 1 and 3, on the outer side of the timer casing 40 is a dial comprising an outer circle 48 preferably carrying a group of spaced numerals such as 10, 20, 30, 40, etc., that represent known degrees of viscosity of liquids, the lower numerals indicating a low viscosity, and the higher numerals higher viscosity. The scale also preferably includes an inner circle 49 which I term a temperature scale carrying a group of numerals such as 60, 70, 80, 90, etc., that represent the temperature of the oil or other liquid undergoing a test. Loose on the arbor 41 is the hub 50 of a pointer 51 that cooperates with the scales 48 and 49. This pointer 51 can be fixed to turn with the arbor 41 by clamping its hub 50 between a fixed collar 52 on the arbor 41 and a clamping nut 53 that may be mounted on a screw threaded outer end of the arbor 41. By slightly backing off the nut 53, the pointer may be set opposite any of the temperature markings on the scale 49, and then made fast on the arbor by turning up the nut 53. The purpose of this temperature scale will be more fully explained later.

The corrugated disc agitators 26 and 27 have been designed to simulate, as closely as possible, the oil splash action occurring, for instance, in the crank case of an automobile when the motor is running. That is, they create a splashing of the oil, and this involves a greater or less tendency of the oil to stick or adhere to the surface of the splash-creating member or members, and this adhering tendency, in turn, of course imparts a degree of resistance to the movement of said member or members, and this resistance is roughly proportional to the thinness or thickness of the liquid; in other words, it is a measure of the viscosity of the liquid.

Briefly describing the operation of the apparatus as thus far described, the container 28 having been supplied with a sample of the liquid to be tested (such, for example, as a body of oil drawn from the crank case of an automobile), the temperature of the oil is first taken, and when ascertained the pointer 51 is set to the corresponding temperature-indicating position on the temperature scale 49. The motor is then started in operation, and this creates comparatively rapid rotation of the corrugated discs 26 and 27, and, at the same time, starts the rotation of the large gear 38. Through the gear segment 47 and pinion 46, the brake is released from the escapement wheel 42, and the clock train immediately begins to run under the impulse of its own spring, thus moving the pointer 51 in the same manner that the minute hand of a clock is driven around its dial. This movement of the timer continues until the gear 38 has made a complete rotation, whereupon the pinion 46 is given another half turn by the gear segment 47, and this applies the brake shoe 45 to the escapement wheel 42 and instantly arrests the movement of the timing mechanism. The reading of the pointer 51 on the outer or viscosity scale 48 is then taken, and this shows the viscosity of the oil under test at the temperature at which the instrument is standardized.

It is desirable to arrest the drive after a test has been completed, and for this purpose I have shown an automatic arresting means, consisting of the following parts. Fast on the shaft 20 is a brake wheel 54, opposite the periphery of which is mounted a slidable brake plunger 55 normally urged into frictional engagement with the wheel 54 by a thrust spring 56. The plunger 55 can be withdrawn by a knob 57 on its lower end, and when so withdrawn, a spring pressed locking bolt 58 snaps into a notch 59 in the plunger 55 and holds it retracted. On the opposite side of the large gear 38 from that on which the gear rack 47 is mounted, and diametrically opposite the latter, is a second gear rack 60 that, once during each complete rotation of the gear 38 engages and imparts a half turn to a pinion 61 fast on one end of a shaft 62. On the other end of said shaft is a disc 63 having a cam side adapted, once during each complete rotation of the shaft 62, to engage a collar 64 fast on the locking bolt 58 and retract the latter against its thrust spring 65. The gear segment 60 first engages the pinion 61 while the timer mechanism is operating, but this merely gives the cam disc 63 an idle half turn without retracting the locking bolt 58. The second time, however, that the segment gear 60 engages with the pinion 61, the cycle of the timing gear has been completed, and the cam disc 63 then retracts the locking bolt 58, allowing the brake plunger 55 and wheel 54 to arrest the movement of the motor.

Referring to the dial feature, and explaining the relation between the viscosity scale 48 and the temperature scale 49, the two scales are so calibrated relatively to each other that the same result reading on the viscosity scale will show when testing a given batch of liquid at different temperatures, by a suitable adjustment or setting of the pointer 51 on the temperature scale. To illustrate this, let it be assumed that the temperature of the liquid undergoing the test is 60°, and that its viscosity at that temperature is 30. The pointer is set to the 60° mark on the temperature scale, as shown in Fig. 3, and the rotation of the timer controlled gear 38 will be at such a speed as to trip out the timer and arrest the pointer at the point 30 on the viscosity scale. Now, let it be assumed that the same batch of liquid is again tested at a temperature of 70°. The pointer 51 will be set opposite the 70° mark on the temperature scale. The liquid being more mobile and less adhesive at 70° than at 60°, the agitators 26 and 27 will rotate more rapidly, and the timer controlling gear will rotate at a correspondingly increased speed, and the timer will be arrested at the time the pointer has reached the viscosity indication on the scale 48.

It will thus be seen that the device is adapted to give a correct viscosity reading on the scale, regardless of the operating temperature of the liquid being tested, provided the scale pointer is first set to the corresponding temperature indication on the scale, so that the apparatus is not limited in its capacity to testing viscosity of a liquid at one temperature only.

It will be understood, of course, that a given temperature scale, such as that shown, is adapted for use with a given type of liquid, such as a class of lubricating oils. Other types of liquid, such, for instance, as molasses, would require a somewhat different temperature scale, which would be determined by trial.

I also preferably provide the apparatus with an accessory in the nature of a counter for registering the number of revolutions of the agitating member or members during a fixed period of time. The intended use of the counter being optional, I have shown means whereby it may be manually coupled to the actuating mechanism of the agitator, and may be automatically disconnected or thrown out of operation by the timing mechanism at the end of a fixed period of time. Describing a mechanism of this character, 70 designates a box which may contain any known counter mechanism actuated from a ratchet wheel 71, and 72 designates a push rod slidably mounted in the top and bottom walls of the counter box, said rod, as best shown in Fig. 6, being formed with a widened intermediate portion 72', in which is mounted to oscillate a short shaft 73 having fast on its inner end a disc 73' from which is eccentrically suspended pawl 73'' adapted, as the shaft 73 is rocked, to drive the ratchet wheel 71. At its outer end, the shaft 73 is equipped with a depending pallet 74, the lower end of which normally lies slightly above the circle of rotation of the tips of a star wheel 75 that is fast on a shaft 76, which is the shaft carrying the speed-reducing gears 36 and 37. When the rod 72 is manually pushed downwardly, the pallet 74 is oscillated to actuate the counter each time it is struck by one of the arms of the star wheel 75. Thus, by lowering the rod 72, the counter is thrown into action, and by raising said rod the counter is thrown out of action.

To automatically throw the counter out of action at the end of a definite period of time determined by the clock train of the timer, the following mechanism may be employed. The lower end of rod 72 is provided with a pin 77 that engages a slot in the free end of the horizontal arm 78 of an elbow lever pivoted at 79 on the under side of the counter box 70. The depending arm 80 of said elbow lever is forked to embrace the outer end of a shaft 81 journaled in the upper portion of the timer casing 40, and is connected to shaft 81 so as to alternately operate and be operated by the latter by a pair of fixed collars 82 and 83 fast on shaft 81, between which collars the forked end of the lever arm 80 lies. Shaft 81 is equipped with a male clutch member 84 adapted to cooperate with a female clutch member 85 rotatably mounted on a shaft 86, the clutch member 85 being backed by a compression spring 87 encircling the shaft 86. The female clutch member 85 carries a wide gear 88 continuously engaged with a narrow gear 89 fast on one of the arbors of the clock train, so that it is driven in fixed time relation to the latter. Inwardly of the clutch member 84, the shaft 81 is formed with an enlargement 90 having a squared inner end that forms an annular shoulder 90', with which cooperates a vertical locking bolt 91 slidably mounted in a bracket arm 92 and having on its upper end a head piece 93. The locking bolt 91 is normally urged downwardly into engagement with the annular shoulder 90' by a thrust spring 94 footed on a collar 95 on the bolt 91. Pivoted on a stud 96 in the inner end of the bracket arm 92 is cam 97 that underlies the head 93 and, when rocked in one direction, is adapted to raise the latter and the locking bolt 91. Fast with the cam 97 is a depending arm 98 (Fig. 4) that, when the clutch is engaged, lies across the path of travel of a pin 99 carried by a disc 100 fast on the shaft 81. A thrust spring 101 encircling the shaft 81 between one of the bearing brackets of the shaft and a collar 102 fast on the shaft normally urges the clutch toward disengaged position and at the same time, through the bell crank lever 78, 80, normally urges the push rod 72 to its upper or raised position, in which the counter actuating mechanism is idle.

The operation of this counter attachment is probably obvious from the foregoing description, but may be briefly described as follows:

If it is desired to use the counter in connection with the making of a test, the operator depresses the push rod 72. This lowers the pallet 74 into the path of movement of the star wheel 75, so that the counter is continuously operated. At the same time, through the elbow lever 78, 80, the shaft 81 is forced inwardly, causing the clutch members 84 and 85 to engage with each other, and at the same time permitting the locking bolt 91 to snap down behind the shoulder 90' and thus lock the shaft 81 in its inward position. This movement also carries the disc 100 and its pin 99 inwardly, so that the pin lies across the vertical plane of the cam arm 98. Thus, when the timing mechanism has moved through a definite period of time, the pin 99 strikes the arm 98, the cam 97 raises the locking bolt 91, the spring 101 disengages the clutch and, at the same time, moves the push rod 72 upwardly, and thus disengages the counter actuating mechanism from the power-actuated drive of the agitator or agitators. The counter thus registers the number of revolutions of the agitator or agitators occurring during a fixed period of time as determined by the timing mechanism. Preferably, the shaft 81 will be so geared to the timing mechanism that the counter will be thrown out of action at the completion of one complete cycle of the timer controlled mechanism.

The main purpose of this counter attachment is to provide a check on the main viscosity indicator. The operator may be provided with a chart which will show the number of revolutions that should be made by the agitator disc or discs in a fixed period of time at given viscosities as indicated by the dial indicator 48. If, now, the number of revolutions shown by the counter correspond to the viscosity as shown by the dial, the operator knows that the dial indication is correct. On the other hand, the operator, if provided with such a chart, might depend upon the counter alone to determine the viscosity.

Where a pair of agitator discs, such as 26 and 27 are employed, it may be desirable, when testing different types of liquids, to set the two discs closer to or farther from each other. To effect such an adjustment, I have shown the tubular shaft 25 of the disc 27 secured by a key 105 to a hub 23' of the miter gear 23, said hub having a step bearing on a shaft bearing 106. By loosening the key 105 the shaft 25 can be adjusted up or down, and then secured in its new position.

The tank 28 is also preferably provided with a removable slotted lid 28', in which may be set a thermometer 107 for conveniently taking the temperature of the liquid preliminary to setting the pointer 51 on the temperature scale 49.

In addition to its use in testing the viscosity of lubricating oils, this device is capable of many other uses, such as obtaining the setting time of glues and cements, obtaining the settling out temperature of liquids that include a crystalline structure, testing the best working temperature and fluidity of starches, comparing the spreading qualities of various paints, and many other uses. It is also manifest that structural details of the apparatus may be variously modified within the purview and scope of the claims.

I claim:

1. In a viscosity testing apparatus for liquids, the combination of a liquid container, a liquid agitating member mounted to move through a body of liquid in said container, power-actuated means for driving said agitating member, a timer mechanism, and means for alternately releasing and arresting said timer mechanism at the beginning and end of a fixed number of equal movements of said agitating member.

2. In a viscosity testing apparatus for liquids, the combination of a liquid container, a liquid agitating member mounted to move through a body of liquid in said container, power-actuated means for driving said agitating member, a timer mechanism including a pointer and a scale graduated in degrees of viscosity, and means geared to said power-actuated means for alternately releasing and arresting said timer mechanism at the beginning and end of a fixed number of equal movements of said agitating member.

3. In a viscosity testing apparatus for liquids, the combination of a liquid container, a liquid agitating member mounted to move through a body of liquid in said container, power-actuated means for driving said agitating member, a timer mechanism including a pointer and a scale graduated in degrees of viscosity and of temperature of the liquid undergoing test, and means geared to said power-actuated means for alternately releasing and arresting said timer mechanism at the beginning and end of a fixed number of equal movements of said agitating member.

4. In a viscosity testing apparatus for liquids, the combination of a liquid container, a liquid agitating member mounted to move through a body of liquid in said container, power-actuated means for driving said agitating member, a timer mechanism, means for alternately releasing and arresting said timer mechanism at the beginning and end of a fixed number of equal movements of said agitating member, and means for automatically arresting the movement of said power-actuated means after the completion of a cycle of said releasing and arresting means.

5. In a viscosity testing apparatus for liquids, the combination of a liquid container, a liquid agitating member mounted to rotate in a body of liquid in said container, power-actuated means for driving said agitating member, a timer mechanism, means for alternately releasing and arresting said timer mechanism at the beginning and end of a fixed number of revolutions of said agitating member, a brake wheel fast on a rotating element of said power-actuated means, a spring-actuated brake plunger co-operating with said brake wheel, means normally locking said plunger disengaged from said wheel, and means for automatically retracting said locking means after the completion of a cycle of said releasing and arresting means.

6. In a viscosity testing apparatus for liquids, the combination of a liquid container, a liquid agitating member mounted to rotate through a body of liquid in said container, power-actuated means for driving said agitating member, a timer mechanism, means for alternately releasing and arresting said timer mechanism at the beginning and end of a fixed number of revolutions of said agitating member, a counter, manually operable means for coupling said counter to said driving means, and automatic means controlled by said timer mechanism for disconnecting said counter at the end of a fixed time period.

7. In a viscosity testing apparatus for liquids, the combination of a liquid container, a liquid agitating member mounted to rotate through a body of liquid in said container, power-actuated means for driving said agitating member, a timer mechanism, means for alternately releasing and arresting said timer mechanism at the beginning and end of a fixed number of revolutions of said agitating member, a counter, manually operable means for coupling said counter to said driving means, automatic means geared to said timer mechanism for disconnecting said counter at the end of a time period determined by said timer mechanism, and means for automatically arresting the movement of said driving means after the completion of a cycle of said releasing and arresting means.

8. In a viscosity testing apparatus for liquids, the combination of a liquid container, a liquid agitating member in the form of a corrugated disc mounted to rotate through a body of liquid in said container, power-actuated means for driving said disc, a timer mechanism, and means for alternately releasing and arresting said timer mechanism at the beginning and end of a fixed number of revolutions of said disc.

9. In a viscosity testing apparatus for liquids, the combination of a liquid container, liquid agitating means in the form of a pair of coaxially mounted spaced corrugated discs mounted to rotate through a body of liquid in said container, power-actuated means for driving said discs simultaneously at equal speeds in opposite directions, a timer mechanism, and means for alternately releasing and arresting said timer mechanism at the beginning and end of a fixed number of revolutions of said discs.

10. In a viscosity testing apparatus for liquids, the combination of a liquid container, liquid agitating means in the form of a pair of coaxially mounted spaced corrugated discs mounted to rotate through a body of liquid in said container, means permitting adjustment of said discs toward and from each other, power-actuated means for driving said discs simultaneously at equal speeds in opposite directions, a timer mechanism, and means for alternately releasing and arresting said timer mechanism at the beginning and end of a fixed number of revolutions of said discs.

11. In a viscosity testing apparatus for liquids, the combination of a liquid container, an agitating member mounted to rotate in a body of liquid in said container, power-actuated means for driving said agitating member, a timer mechanism, means for alternately releasing and arresting said timer mechanism at the beginning and end of a fixed number of revolutions of said agitating member, a counter driven from said power-actuated means for registering the number of revolutions of said agitating member during a definite time period, and means controlled by said timer mechanism for disconnecting said counter from said power-actuated means at the end of said definite time period.

12. In a device for determining the consistency of a liquid, two spaced members positioned in parallel planes and adapted to be immersed in the liquid, means for rotating said members in opposite directions under a constant force and at equal velocities, and means for indicating the effect of the drag of the liquid on said members.

FRANCIS M. HESS.

CERTIFICATE OF CORRECTION.

Patent No. 2,051,523.   August 18, 1936.

FRANCIS M. HESS.

It is hereby certified that error appears in the printed specification of the above numbered patent requiring correction as follows: Page 2, second column, line 69, before "on" insert the numeral 30; and that the said Letters Patent should be read with this correction therein that the same may conform to the record of the case in the Patent Office.

Signed and sealed this 13th day of October, A. D. 1936.

Henry Van Arsdale (Seal)   Acting Commissioner of Patents.